(12) United States Patent
Martin et al.

(10) Patent No.: US 8,741,989 B2
(45) Date of Patent: Jun. 3, 2014

(54) INCORPORATION OF A RESIN DISPERSION TO IMPROVE THE MOISTURE RESISTANCE OF GYPSUM PRODUCTS

(75) Inventors: Laura Lee Martin, Blountville, TN (US); Andrea Gail Hagood, Kingsport, TN (US); Carol Ann Perkins, Kingsport, TN (US); Rajesh Raja Puthenkovilakom, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 495 days.

(21) Appl. No.: 13/027,412

(22) Filed: Feb. 15, 2011

(65) Prior Publication Data

US 2011/0136945 A1    Jun. 9, 2011

Related U.S. Application Data

(62) Division of application No. 12/259,485, filed on Oct. 28, 2008, now Pat. No. 7,897,660.

(60) Provisional application No. 60/999,772, filed on Oct. 29, 2007.

(51) Int. Cl.
   *C08K 3/00*      (2006.01)
   *C04B 24/26*     (2006.01)

(52) U.S. Cl.
   USPC .................................. 524/3; 524/5

(58) Field of Classification Search
   USPC ................................................... 524/3
   See application file for complete search history.

(56) References Cited

U.S. PATENT DOCUMENTS

| | | | |
|---|---|---|---|
| 2,483,806 A | | 10/1949 | Buckley et al. |
| 2,610,130 A | * | 9/1952 | Riddell et al. ............. 106/658 |
| 2,957,774 A | * | 10/1960 | Selbe et al. ............... 106/658 |
| 2,957,775 A | | 10/1960 | Jacobson |
| 3,816,363 A | | 6/1974 | Wicht et al. |
| 4,775,713 A | | 10/1988 | Homma et al. |
| 5,087,603 A | | 2/1992 | Izubayashi et al. |
| 5,098,943 A | * | 3/1992 | Tagawa et al. ............. 524/423 |
| 5,162,415 A | | 11/1992 | Rehmer et al. |
| 5,208,282 A | | 5/1993 | Rehmer et al. |
| 5,242,649 A | | 9/1993 | Yamamoto et al. |
| 5,552,187 A | | 9/1996 | Green et al. |
| 5,695,553 A | | 12/1997 | Claret et al. |
| 5,916,963 A | | 6/1999 | Hashimoto et al. |
| 6,010,596 A | | 1/2000 | Song |
| 6,106,607 A | | 8/2000 | Be et al. |
| 6,262,149 B1 | | 7/2001 | Clark et al. |
| 2004/0127681 A1 | | 7/2004 | Kutsek |
| 2005/0113499 A1 | | 5/2005 | Tamcke et al. |
| 2006/0194907 A1 | | 8/2006 | Gottlieb |
| 2006/0196391 A1 | | 9/2006 | Hassan et al. |

FOREIGN PATENT DOCUMENTS

| | | |
|---|---|---|
| EP | 0 787 757 A2 | 8/1997 |
| EP | 1 424 366 A1 | 6/2004 |
| WO | WO 00/63294 A1 | 10/2000 |
| WO | WO 02/058902 A2 | 8/2002 |
| WO | WO 2004/076517 A1 | 9/2004 |
| WO | WO 2007/105344 A1 | 9/2007 |

OTHER PUBLICATIONS

Buehner, Rita W. and Atzinger, Gina D., "Waterborne Epoxy Dispersions in Adhesive Applications," 1991, SC:2267-02, URL: http://www.resins.com/resins/am/pdf/SC2267.pdf.
Notification of Transmittal of the International Search Report and the Written Opinion of the International Searching Authority, or the Declaration date of mailing Mar. 6, 2009 received in International Patent Application No. PCT/US2008/012260.

* cited by examiner

*Primary Examiner* — Hui Chin
(74) *Attorney, Agent, or Firm* — James K. Leonard; Michael K. Carrier

(57) ABSTRACT

This invention relates to a composition suitable for use in making moisture resistant gypsum products. In particular, this invention relates to resin dispersions and their use in combination with gypsum to form moisture resistant gypsum compositions which are settable by hydration. Further, the invention relates to moisture resistant products formed from such settable gypsum compositions, e.g. panels and boards, and a method for the manufacture of such moisture resistant gypsum products.

17 Claims, No Drawings

INCORPORATION OF A RESIN DISPERSION TO IMPROVE THE MOISTURE RESISTANCE OF GYPSUM PRODUCTS

CROSS-REFERENCE TO RELATED APPLICATIONS

This application is a divisional of U.S. patent application Ser. No. 12/259,485, filed on Oct. 28, 2008, which claims benefit of U.S. Provisional Application No. 60/999,772 filed Oct. 29, 2007 the disclosures of which are incorporated herein by reference in their entirety.

BACKGROUND OF THE INVENTION

Certain properties of gypsum (calcium sulfate dehydrate) make it popular for use in building products. Typically, gypsum is employed in panels or boards known as wallboard, a commonly used building material for a variety of structures. These gypsum products are produced by mixing anhydrous calcium sulfate or calcium sulfate hemihydrate with water and allowing the mixture to hydrate or set as calcium sulfate dihydrate, a relatively hard material. In the form of wallboard, there is a core panel of set gypsum sandwiched between a pair of liners made of paper or glass fiber although any type of sheet-like material could be used.

In many applications, wallboard is exposed to moisture and water which presents a problem in that set gypsum readily absorbs water and loses its strength. A variety of techniques have been used to render gypsum wallboard water-resistant or water-repellant.

Many attempts have been made in the past to improve the water resistance of gypsum products. These attempts have included the incorporation of water-resistant materials such as metallic soaps, asphalt, waxes, silicon compounds, synthetic polymer resins, or synthetic polymer emulsions within the gypsum slurry during the manufacturing process. They have also included attempts to coat the finished gypsum product with water-resistant films or coatings.

There are many additives cited in the patent literature which claim to improve moisture resistance. These additives include, for example, vegetable oils, fatty acids, wax emulsions, styrene butadiene emulsions, vinyl acetate emulsions, asphaltic emulsions, siliconized waxes, polysiloxanes, polyurethanes, and polyvinyl alcohol.

The present invention relates to resin dispersions that improve the moisture resistance of gypsum structural products used in industrial, commercial or residential applications where water and humid conditions are encountered.

BRIEF SUMMARY OF THE INVENTION

One aspect of the present invention pertains to a moisture resistant gypsum composition comprising (a) gypsum and (b) a resin dispersion comprising at least one resin, at least one surfactant and water.

Another aspect of the present invention pertains to a moisture resistant gypsum composition comprising gypsum and a resin dispersion comprising at least one resin, at least one surfactant and water, wherein the resin is one or more of natural and modified rosins and the hydrogenated derivatives thereof; esters of natural and modified rosins and the hydrogenated derivatives thereof; polyterpene resins and hydrogenated polyterpene resins including natural terpenes, aromatically modified terpene resins, and synthetic polyterpenes; aliphatic petroleum hydrocarbon resins and the hydrogenated derivatives thereof; aromatic hydrocarbon resins and the hydrogenated derivatives thereof; alicyclic petroleum hydrocarbon resins and the hydrogenated derivatives thereof, cycloaliphatic resins, mixed aliphatic-aromatic resins, pentaerythritol, glycerols or triethylene glycol esters of rosin.

Another aspect of the present invention pertains to a moisture resistant gypsum composition comprising (a) gypsum and (b) a resin dispersion comprising at least one resin, at least one surfactant and water; wherein the resin is one or more of rosins, rosin derivatives, rosin esters, hydrogenated rosin esters, hydrocarbon resins, aliphatic resins, cycloaliphatic resins, aromatic hydrocarbon resins, mixed aliphatic-aromatic resins and the hydrogenated derivatives thereof, polyterpenes, synthetic polyterpenes, natural terpenes, or aromatically modified terpene resins; and wherein the surfactant is a rosin acid, a hydrogenated rosin acid, a disproportionated rosin acid, or a modified rosin acid.

The present invention also pertains to a method to render a gypsum product moisture resistant, the method comprising the steps of: forming a mixture comprising gypsum and water; adding a resin dispersion to the aqueous gypsum mixture, wherein the resin dispersion comprises at least one resin, at least one surfactant, and water.

DETAILED DESCRIPTION

Before the present compositions of matter and methods are disclosed and described, it is to be understood that this invention is not limited to specific synthetic methods or to particular formulations, except as indicated, and as such, may vary from the disclosure. It is also to be understood that the terminology used is for the purpose of describing particular embodiments only, and is not intended to limit the scope of the invention.

The singular forms "a," "an," and "the" include plural referents, unless the context clearly dictates otherwise.

Optional or optionally means that the subsequently described events or circumstances may or may not occur. The description includes instances where the events or circumstances occur, and instances where they do not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains.

A "rosin acid" according to the present invention is understood to comprise a mixture of various rosin acid molecules. Mixtures of this kind that are readily available and occur in nature include, but are not limited to, tall oil rosin, gum rosin or wood rosin. These natural mixtures may comprise rosin acids of the abietic type and/or the pimaric type such as abietic acid, palustric acid, neoabietic acid, levopimaric acid, pimaric acid, isopimaric acid or dehydroabietic acid, among others, in varying amounts. In addition to rosin acids with one carboxylic acid functionality, rosin acids with two or more carboxylic acid functionalities are also considered as rosin acids in the meaning of the present invention.

A "rosin acid derivative" according to the present invention is any molecule that has the molecular rosin acid backbone but is modified in at least one of the following ways. In one embodiment, at least one double bond is hydrogenated (hydrogenation). In another embodiment, at least one of the rings of the rosin and backbone is dehydrogenated so that an aromatic ring results (dehydrogenation). In yet another embodiment, adducts to the conjugated double bonds of the rosin acid backbone are included, in particular the addition of maleic anhydride in a Diels-Alder type reaction. The resulting adduct is considered one type of a rosin acid derivative according to the present invention.

A "rosin ester" according to the present invention is any molecule in which at least two rosin acid or rosin acid derivative units are connected by means of at least two ester linkages. Any molecule with at least two hydroxyl groups can be used to provide the ester linkage between at least two rosin acids units. Common examples include, but are not limited to, glycerol esters, pentaerythritol esters and (triethylene) glycol esters.

The "solid content" of a resin dispersion is given in % weight per overall weight of the dispersion (unless indicated otherwise).

The "resin dispersions" according to the present invention are dispersions of resin entities wherein the solvent is generally water or an aqueous solution. However, mixtures of water with a non-aqueous solvent, in particular an organic solvent, would also be suitable as long as the foaming properties or other dispersion properties are not negatively affected. Mixtures of water with other water-soluble solvents could also be used as well.

The terms "water resistant" and "moisture resistant" are used interchangeably herein.

The term "gypsum" will be used to refer to both calcium sulfate in the stable dihydrate state; i.e. $CaSO_4.2H_2O$, and includes the naturally occurring mineral, the synthetically derived equivalents, and the dihydrate material formed by the hydration of calcium sulfate hemihydrate or anhydrite. Additionally, "gypsum" is meant to include other forms of calcium sulfate that occur during the process of gypsum product manufacturing, such as calcium sulfate anhydrite, calcium sulfate hemihydrate, calcium sulfate dihydrate, or mixtures thereof.

In the preparation of gypsum products, it is believed by those skilled in the art that gypsum, calcium sulfate dihydrate, upon heating at specific temperatures, becomes converted to a calcined gypsum, i.e., calcium sulfate hemihydrate. It is the calcined gypsum, the calcium sulfate hemihydrate, that is commonly used for the preparation of gypsum products, ranging from stucco to gypsum wallboard or other formed products. It is further believed that upon addition of water to the calcium sulfate hemihydrate, the calcium sulfate becomes rehydrated towards the dihydrate form, and this is accompanied by a rearrangement of the crystalline structure to produce a product, that when it is dry, can form a rigid structure. Temperatures of between 100° C. to 200° C. are commonly used to convert calcium sulfate dihydrate to the hemihydrate form. The temperature and time period are often chosen based upon specific manufacturing concerns. For example, a shorter heating time at a slightly higher temperature may be used to speed up production, or a longer time at a lower temperature may be used, for example, to minimize degradation of certain components.

Generally, the manufacture of gypsum products starts with pulverizing the crude gypsum, generally in the form of rocks, and then adding water to the gypsum to make a slurry. In addition to water, any one or more, or combinations thereof, of other ingredients may be added to the preparation. Examples of these other ingredients which are conventionally used in the manufacture of gypsum sheathing include set accelerators, retarders, foaming agents, reinforcing fibers, and dispersing agents, and which will be described further in greater detail. These other ingredients are usually added dry, but liquids may also be used. The preparations, after mixing, are generally heated at a high temperature for specific time periods, after which the resulting slurry is deposited between two fibrous mats, such as paper, which are sufficiently porous to permit water in the aqueous gypsum slurry to evaporate therethrough. The deposited preparation is then subjected to pressure, to produce a desired thickness. Aided by heating, excess water evaporates through the porous mat after the calcined gypsum sets. As the gypsum hydrates or sets, it forms calcium sulfate dihydrate ($CaSO_4.2H_2O$), a relatively hard material, and forms crystalline structures that build strength and allow for drying to produce a dimensionally stable wallboard.

The present invention relates to an additive for improving the moisture resistance of gypsum-based products such as structural panels, drywall and ceiling panels that are used, for instance, in industrial, residential and commercial building and construction applications. Typically, building and construction applications that involve humid or wet conditions, such as bathrooms, kitchens or basement areas, require the use of gypsum drywall panels with enhanced moisture resistance. This enhanced moisture resistance minimizes the growth of mold and bacteria on the surface of the gypsum panels. Moisture resistance also results in maintained structural integrity of the gypsum panels. In the present invention, the additives comprise resin dispersions.

Typically, the resin dispersions of the present invention are added to the gypsum, during the manufacture of gypsum-based products. One embodiment of the present invention pertains to a method for preparing moisture resistant gypsum products. According to the present invention "gypsum products" typically include products such as regular gypsum board, impregnated board, hard board, high density board, water repellent board, wallboard, or cement board.

One embodiment of the present invention is a moisture resistant gypsum composition comprising (a) gypsum and (b) a resin dispersion comprising at least one resin, at least one surfactant and water.

Suitably, any resin(s) or any resinous material(s) conventionally used in resin dispersions are suitable for use according to the present invention. For example, suitable classes of resins include hydrocarbon resins, rosin esters, rosin resins, polyterpene resins, pentaerythritol, glycerol, triethylene glycol esters of rosin, or mixtures thereof.

Suitable resins include, but are not limited to, (1) esters of natural and modified rosins and the hydrogenated derivatives thereof; (2) polyterpene resins and hydrogenated polyterpene resins; (3) aliphatic petroleum hydrocarbon resins and the hydrogenated derivatives thereof; (4) aromatic hydrocarbon resins and the hydrogenated derivatives thereof; or (5) alicyclic petroleum hydrocarbon resins and the hydrogenated derivatives thereof. Mixtures of two or more of the above-described resins suitably may be used in some embodiments.

Suitably, in other embodiments, the rosin can be an unmodified or a modified rosin. There are many different ways of modifying rosins. For example, the rosin can be esterified. In some embodiments, the rosin is a glycerol, pentaerythritol or triethylene glycol ester of a rosin acid. Suitably, in other embodiments, any low molecular weight compounds containing multiple hydroxyl groups could be used to produce rosin esters.

According to the present invention, suitable hydrocarbon resins include aliphatic or aromatic hydrocarbon resins, DCPD resins, terpene resins, and terpene/phenol resins. For example, suitable hydrocarbon resins may also include C5 resins, C9 resins, C5-C9 resins, hydrogenated C5-resins, Hydrogenated C9 resins, hydrogenated C5-C9 resins and mixtures thereof. Those resins obtained by reacting or polymerizing the component mixtures of a five carbon stream from petroleum refining commonly referred as C5 stream and/or a nine carbon stream commonly referred as C9 stream and the resins prepared using these are then called C5 resins and/or C9 resins. The components of a C5-C9 stream are unsaturated aliphatic and/or vinyl aromatic hydrocarbon compounds, either straight or branched, where the number of carbons generally is at or between C5 and C9.

Hydrocarbon resins may also include, but are not limited to, aliphatic resins, cycloaliphatic resins, pure monomer resins, aromatic hydrocarbon resins, mixed aliphatic-aromatic resins, polyterpenes, aromatically modified terpene resins or any combination thereof. In addition, hydrocarbon resins may be partially or fully hydrogenated.

Aliphatic resins according to the present invention are defined as resins produced from at least one monomer selected from alkanes, alkenes, and alkynes. These monomers can be straight chains or branched. For example, an aliphatic resin can be produced by polymerizing cis- and trans-piperylene, isoprene, and dicyclopentadiene. Examples of aliphatic resins include, but are not limited to, Piccotac® 1095 from Eastman Chemical; Hikorez® C-110 available from Kolon Industries; and Wingtack® 95 available from Goodyear Chemical. Hydrogenated cycloaliphatic resins include, but are not limited to, Eastotac® H-100, Eastotac® H-115, Eastotac® H-130, and Eastotac® H-142 available from Eastman Chemical. These resins have Ring and Ball softening points of 100° C., 115° C., 130° C., and 142° C., respectively. The Eastotac® resins are available in various grades (E, R, L and W) that differ in the level of hydrogenation.

Aromatic or pure monomer hydrocarbon resins are defined as hydrocarbon resins produced from at least one unsaturated cyclic hydrocarbon monomer having one or more rings. For example, pure monomer hydrocarbon resins can be produced from polymerizing indene or methylindene with styrene or methylstyrene in the presence of a Lewis acid. Commercial examples of pure monomer hydrocarbon resins include, but are not limited to, Kristalex® 3100 and Kristalex® 5140 available from Eastman Chemical. Hydrogenated aromatic resins include, but are not limited to, Regalrez® 1094 and Regalrez® 1128 available from Eastman Chemical.

Aliphatic-aromatic resins are produced from at least one aliphatic monomer and at least one aromatic monomer. Aliphatic monomers and aromatic monomers were defined previously in this disclosure. Examples of aliphatic-aromatic resins include, but are not limited to, Piccotac® 9095 available from Eastman Chemical and Wingtack® Extra available from Goodyear Chemical. Hydrogenated aliphatic-aromatic resins include, but are not limited to, Regalite® V3100 available from Eastman Chemical and Escorez® 5600 available from Exxon Mobil Chemical.

Polyterpene resins are defined as resins produced from at least one terpene monomer. For example, α-pinene, β-pinene, d-limonene, and dipentene can be polymerized in the presence of aluminum chloride to provide polyterpene resins. Other examples of polyterpene resins include, but are not limited to, Sylvares® TR 1100 available from Arizona Chemical, and Piccolyte® A125 available from Pinova. Examples of aromatically modified terpene resins include, but are not limited to, Sylvares® ZT 105LT and Sylvares® ZT 115LT available from Arizona Chemical.

Rosin resins suitable for the aqueous resin dispersions of the invention include rosin acids and rosin derivatives. Rosin acids are produced from wood, gum or tall oil rosin. Wood rosin is harvested from the stumps of trees. Gum rosin is collected from the sap of trees in regions such as China and Brazil. Tall oil rosin is a by-product of the Kraft paper process. The distribution of rosin acid isomers varies within each of these sources. Rosin acids may be partially or fully hydrogenated or disproportionated. Examples include, but are not limited to, Pamite® 90, Staybelite® Resin E and Foral® AX-E available from Eastman Chemical Company.

Rosin derivatives may be dimerized or polymerized from rosin acid. Rosin derivatives also include rosin esters that are the reaction product of rosin acid and a single or multifunctional alcohol. Aromatic and aliphatic alcohols suitable for synthesizing rosin esters include, but are not limited to, pentaerythritol, glycerol, triethylene glycol and methanol. Rosin derivatives may be modified with phenol, maleic acid, fumaric acid or other suitable polar compounds. Rosin acids may be partially or fully hydrogenated or disproportionated. Examples include, but are not limited to, Polypale® Resin, Dymerex® Resin, Foralyn® 90, Pentalyn® H-E and Permalyn® 4100 available from Eastman Chemical Company. Other useful examples are Sylvatac® RE 4216 and Sylvatac® RE 85 available from Arizona Chemical.

The resin can be characterized by a Ring and Ball softening point ranging from about 10° C. to about 150° C. and have molecular weights from 300-10,000 g/mol. More preferably the resins range in softening point from about 10° C. to about 100° C. and have molecular weights from 300-3,000 g/mol.

According to the present invention, the resin dispersions are added in proportions sufficient to provide about 0.5 weight percent to about 65 weight percent based on the total weight of the gypsum composition. In one embodiment of the present invention, the resin dispersion are added in proportions sufficient to provide about 0.5 weight percent to about 65 percent weight percent, or from about 1 weight percent to about 60 weight percent, or from about 5 weight percent to about 50 weight percent, or from about 10 weight percent to about 40 weight percent, based on the total weight of the gypsum composition.

Any conventional surfactant or combination of surfactants is suitable for use in the present invention. For example, suitable surfactants include alkali metal soaps of carboxylates such as wood rosins, gum rosins, tall oil rosins, disproportionated rosins, polymerized rosins, hydrogenated rosins, esters thereof, and/or blends thereof. Suitably, the surfactants may also be alkali metal salts, ammonium salts, or amine salts of alkyl sulfates, alkyl sulfonates, alkyl aryl sulfates, alkyl aryl sulfonates, ethoxylated alkylphenol sulfates, ethoxylated alkylphenol sulfonates, and sulfates and sulfonates of fatty acids.

For example, in some embodiments the rosins may comprise rosin acids. Generally, rosins acids are mixtures of $C_{20}$ monobasic carboxylic acids containing a phenanthrene skeleton.

Rosin acids include rosins and rosin derivatives obtained from naturally occurring sources such as tall oil rosin, gum rosin, or wood rosin, dimerized rosins and polymerized rosins. Fractions or mixtures of these sources may be used as well. The mixtures may be a combination of two or more of the natural products with each other or the natural products may be mixed with purified or synthetically produced rosin acids as well. No limitations exist with respect to the degree of hydrogenation, dehydrogenation or the variation of any of the functional groups that may be attached to the rosin acid as long as the carboxyl-functionality remains intact for at least some of the molecules.

Examples of suitable rosins and rosin derivatives include, but are not limited to, Foral® AX-E, Foralyn® 90, Dymerex® resin, Polystix® 90 and Permalyn® 3100 available from Eastman Chemical. Other useful examples are Sylvatac® RE 4216 and Sylvatac® RE 85 available from Arizona Chemical.

Suitably, unsaturated fatty acids such as, for example, myristoleic acid, palmitoleic acid, oleic acid, linoleic acid, alpha-linolenic acid, arachidonic acid, eicosapentaenoic acid, erucic acid, or docosahexaenoic acid also may be used as surfactants according to the present invention. By further example, saturated fatty acids such as, for example, butyric (butanoic acid), caproic (hexanoic acid), caprylic (octanoic acid), capric (decanoic acid), lauric (dodecanoic acid), myristic (tetradecanoic acid), palmitic (hexadecanoic acid), stearic (octadecanoic acid), arachidic (icosanoic acid), or behenic (docosanoic acid) suitably may be used as surfactants according to the present invention.

Suitably, ionic (ie. ionizable) surfactants or nonionic (ie nonionizable) surfactants may be used in various embodiments of the present invention. For example, suitable nonionic surfactants include, but are not limited to, any long chain ethyoxylate block copolymers, any hydroxyl terminal long chain ethoxylates, alcohol ethoxylates, alkyl ethoxylates, alkyl phenols, alkyl phenol ethoxylates, alkyl alcohol ethoxylates, alkyl sulphonates, fatty alcohol sulphates, and alkyl phenol ethoxylate phosphates, or phosphate esters.

Examples of suitable alkyl phenol ethoxylates include, but are not limited to, nonylphenol ethoxylate phosphates. The term 'nonylphenol' represents a large number of isomeric compounds of the general formula $HOC_6H_4C_9H_{19}$. Commercially produced nonylphenols are predominantly 4-nonylphenol with a varied and undefined degree of branching in the attached alkyl group, alkylsulfonic acid, fatty acid, oxyethylated alkyphenol and derivatives, or mixtures thereof.

Examples of suitable nonionic surfactants include, but are not limited to, fatty alkanolamide; oleyl diethanolamide; lauryl diethanolamide; coconut diethanolamide; fatty diethanolamide; lauramide dealauryl diethanolamide; PEG-6 lauramide; lauryl/myristyl monoethanolamide; oleic diethanolamide; alkyl ether phosphate; glycerol monooleate; polyglyceryl-10 decaoleate; polyglycerol esters; polyglycerol polyricinoleate; caprylic/capric triglyceride; caprylic triglyceride; tridecyl alcohol phosphate ester; nonylphenol ethoxylate phosphate ester; cetyl palmitate; butoxy ethyl stearate; butyl stearate; methyl laurate; methyl palmitate/oleate; PEG-2 stearate; glyceryl oleate; glyceryl stearate; isopropyl myristate; isopropyl palmitate; ethylhexyl isononanoate; PEG-4 dioleate; PEG-8 dilaurate; PEG-8 dioleate; PEG-8 distearate; PEG-8 laurate; PEG-8 oleate; PEG-8 stearate; PEG-12 dilaurate; PEG-12 dioleate; PEG-12 distearate; PEG-12 laurate; PEG-150 distearate; PEG-150 stearate; propylene glycol stearate; nonylphenol POE 10 phosphate ester; nonylphenol POE 6 phosphate ester; nonylphenol POE 8 phosphate ester; nonylphenol POE-12 phosphate ester; soybean oil, methyl ester; fatty alkyl ethoxylate; fatty alcohol ethoxylate; fatty acid ethoxylate; alcohol ethoxylate; tallow amine ethoxylate, POE-2; octyl phenol 12 mole ethoxylate; nonyl phenol 1.5 mole ethoxylate; nonyl phenol 4 mole ethoxylate; nonyl phenol 6 mole ethoxylate; nonyl phenol 9 mole ethoxylate; nonyl phenol 10 mole ethoxylate; nonyl phenol 10.5 mole ethoxylate; nonyl phenol 12 mole ethoxylate; nonyl phenol 15 mole ethoxylate; nonyl phenol 30 mole ethoxylate; nonyl phenol 40 mole ethoxylate; castor oil ethoxylate; castor oil 40 mole ethoxylate; octyl phenol 5 mole ethoxylate; octyl phenol 7 mole ethoxylate; octyl phenol 9 mole ethoxylate; octyl phenol 12 mole ethoxylate; octyl phenol 40 mole ethoxylate; octyl phenol ethoxylate; decyl alcohol ethoxylate, POE-4; decyl alcohol ethoxylate, POE-6; decyl alcohol ethoxylate, POE-9; tridecyl alcohol ethoxylate; tridecyl alcohol ethoxylate, POE-12; tridecyl alcohol ethoxylate, POE-18; tridecyl alcohol ethoxylate, POE-3; tridecyl alcohol ethoxylate, POE-6; tristyrylphenol ethoxylate; fatty acid ethoxylate, POE-3; fatty acid ethoxylate, POE-10; fatty acid ethoxylate, POE-15; octylphenol ethoxylate, 30 EO; octylphenol ethoxylate, 40 EO; tristyrylphenol ethoxylate POE-16 phosphate ester; ethoxylated coco amine; sorbital trioleate ethoxylate, POE 20; sorbital monooleate ethoxylate, POE 20; tallow amine ethoxylate, POE-15; tallow amine ethoxylate, POE-2; or tallow amine ethoxylate, POE-5.

Suitably, ionic surfactants also may be used in some embodiments of the present invention. For example, in one embodiment, the surfactants may be any ionizable organic compounds whose neutralized salts are amphiphilic in nature, such as, for example, any carboxylic acid containing compound, any phosphoric acid containing compound, any sulfuric acid containing compound, any alkyl sulphonates, any fatty alcohol sulphate containing compounds, any sulfonic acid containing compound, any sulfonate succinic acid containing compound, any sulfosuccinic acid containing compound, or any sulfosuccinamic acid containing compound, or any disulfosuccinic acid containing compound.

For example, the following surfactants would be suitable for use as ionic surfactants according to the present invention: alkyldiphenyloxide disulfonate, sodium dodecylbenzene sulfonate; (neutralized) dodecylbenzene sulfonic acid; potassium dodecylbenzene sulfonate; sodium dodecylbenzene sulfonate; ammonium nonylphenol ethoxylate sulfate; sodium nonylphenol ethoxylate sulfate; sodium lauryl ether sulfate; ammonium lauryl ether sulfate; sodium decyl sulfate; sodium lauryl sulfate; sodium octyl sulfate; sodium tridecyl sulfate; sodium tridecyl ether sulfate; potassium oleate sulfonate; tridecyl alcohol phosphate ester; tridecyl alcohol ethoxylate; sodium dioctyl sulfonate succinate; tristyrylphenol ethoxylate-POE-16 phosphate ester, potassium salt, tristyrylphenol ethoxylate-POE-16 phosphate ester, amine salt; magnesium lauryl sulfate; sodium decyl sulfate; sodium 2-ethyl hexyl sulfate; sodium C14-16 olefin sulfonate; tetrasodium dicarboxyethyl stearyl sulfosuccinamate; sodium alkyl sulfonates; sodium octyl sulfate; alkyl napthalene sulfonate; sodium tridecyl ether sulfate; triethyl ammonium lauryl sulfate; sodium decylglucosides hydroxypropyl sulfonate; sodium decylglucosides hydroxypropyl sulfonate; sodium laurylglucosides hydroxypropyl sulfonate; sodium didecylglucosides hydroxypropyl phosphate; sodium dilaurylglucosides hydroxypropyl phosphate; sodium dibutylglucosides hydroxypropyl phosphate; potassium monoalkyl phosphate; triethanolamine monoalkyl phosphate; sodium dioctyl sulfosuccinate; sodium decyl diphenyl oxide disulfonate; disodium oleamido MEA sulfosuccinate; disodium ricinoleamido MEA sulfosuccinate; ammonium lauryl sulfosuccinate; sodium dodecyl diphenyl oxide disulfonate; sodium ditridecyl sulfosuccinate; sodium laureth sulfate (2 EO); sodium laureth sulfate; ammonium lauryl sulfate; ammonium laureth sulfate; TEA-lauryl sulfate; TEA-laureth sulfate; MEA-lauryl sulfate; MEA-laureth sulfate; potassium lauryl sulfate; potassium laureth sulfate; sodium decyl sulfate; sodium octyl/decyl sulfate; sodium 2-ethylhexyl sulfate; sodium octyl sulfate; α-olefin sulfonate; sodium α-olefin sulfonate; alkyl phonol ether sulfate; sodium nonoxynol-4 sulfate; sodium nonoxynol-6 sulfate; or ammonium nonoxynol-6 sulfate.

Examples of suitable alkyl aryl sulphonates include, but are not limited to, sodium or ammonium alkyl benzene sulphonates, fatty alcohol sulphates, e.g. sodium lauryl sulphate, salts of mono- and di-esters of orthophosphoric acid, sodium salts of sulphated monoglycerides and sulphonates or sulphosuccinates of alkyl phenol polyoxyalkylene oxide condensates or of polyoxyalkylene oxide condensates, e.g. the ammonium salt of nonylphenol polyethylene oxide sulphonic acid.

Typically, the surfactants are added so as to be present in the resin dispersion in an amount of suitably from about 2% to about 15% by weight, based on the weight of resinous material, for example from about 5% to about 10% by weight. Sufficient hot water, suitably from about 5% to about 15% by weight, based on the weight of resinous material, is stirred in to form a creamy water-in-oil emulsion. Upon dilution with water, suitably in an amount of from about 10% to about 35% by weight, based on the weight of resinous material, for example from about 15% to about 30% by weight, or from about 20% to about 25% by weight, the emulsion inverts to provide a stable oil-in-water emulsion. The dispersion is suitably further diluted with water until the desired solids content is reached.

In a further step, water may be slowly added to the resin mixture under agitation until phase inversion is reached. In one embodiment, the resulting emulsion is further diluted to the desired total solid content. The resulting dispersion is then slowly cooled under gentle agitation.

The average particle size of the resins in the resin dispersions as discussed above is suitably less than about 10 µm. For example, the average particle size of the resin is less than about 2 µm or less than about 1 µm or even less than about 500 nm. In another embodiment, the average particle size of the resins is less than about 250 nm. Generally, particle sizes and particle size distributions are measured with (laser) light scattering methods.

In a further embodiment, the resin dispersions have a Brookfield viscosity of less than about 6000 cPs or less than about 4000 cPs. Generally, viscosities are measured with a Brookfield LVT Viscometer. Surfactants with higher viscosities are covered by the present invention as long as the foam behavior is acceptable and the solid content is within the specified ranges.

For example, the viscosity of the resin dispersion is suitably adapted to the specific use but is suitably, measured as Brookfield (spindle 3@50 rpm) at 20° C., from about 100 to about 6000 cPs, such as from about 500 to about 5000 cPs, or from about 1000 to about 4000 cPs.

The solids content, i.e. the dry content of resinous material and surfactants, in the resin dispersion is suitably at least about 20% by weight up to the maximum content achievable such as, for example, at least about 50% to about 70% by weight, or even from about 55% to about 65% by weight.

One embodiment of the present invention provides a moisture resistant gypsum composition comprising gypsum and a resin dispersion comprising at least one resin, at least one surfactant and water, wherein the resin is one or more of natural and modified rosins and the hydrogenated derivatives thereof; esters of natural and modified rosins and the hydrogenated derivatives thereof; polyterpene resins and hydrogenated polyterpene resins including natural terpenes, aromatically modified terpene resins, and synthetic polyterpenes; aliphatic petroleum hydrocarbon resins and the hydrogenated derivatives thereof; aromatic hydrocarbon resins and the hydrogenated derivatives thereof; alicyclic petroleum hydrocarbon resins and the hydrogenated derivatives thereof, cycloaliphatic resins, mixed aliphatic-aromatic resins, pentaerythritol, glycerols or triethylene glycol esters of rosin.

Another embodiment of the present invention provides a moisture resistant gypsum composition comprising (a) gypsum and (b) a resin dispersion comprising at least one resin, at least one surfactant and water; wherein the resin is one or more of rosins, rosin derivatives, rosin esters, hydrogenated rosin esters, hydrocarbon resins, aliphatic resins, cycloaliphatic resins, aromatic hydrocarbon resins, mixed aliphatic-aromatic resins and the hydrogenated derivatives thereof, polyterpenes, synthetic polyterpenes, natural terpenes, or aromatically modified terpene resins; and wherein the surfactant is a rosin acid, a hydrogenated rosin acid, a disproportionated rosin acid, or a modified rosin acid.

Any conventional method for producing dispersions may be used according the present invention. In general, to produce the dispersion, the resinous material is contacted with one or more surfactants and water by any method known in the art.

In one embodiment, the resin dispersion may be produced by a batch inversion process. In another embodiment, they may be produced using a continuous process.

In other embodiments of the present invention, the resin dispersions may be produced by various methods including total solvent systems, solvent-assisted systems, and waterborne systems.

For total solvent systems, the resin is dissolved in a solvent and used as a solventborne material. In a solvent-assisted system, the resin is dissolved in a minimum amount of solvent to aid with the dispersion process and is subsequently added to water. For waterborne systems, the resin is melted above its softening point and directly added to water. There are many variations in equipment configurations that may be used to manufacture the resin dispersions of the present invention.

In addition, conventional additives such as plasticizers(s), thickener(s), biocide/preservative(s) and antioxidant(s) may be added to the resin dispersions of the present invention.

Suitably plasticizers that may be used in resin dispersions of the present invention include liquid or low softening point tackifying resins, petroleum-derived oils, aromatic hydrocarbon oils, paraffinic oils, napthenic oils, olefin oligomers, low molecular weight polymers, vegetable and animal oils and their derivatives.

Antioxidant may be added to the resin dispersions of the invention to prevent oxidation and/or color degradation. Hindered phenols are typically used in applications where minimum color degradation is required. Amine-type antioxidants may be used, if discoloration is not important. Antioxidants that may be used include BHT (2,6 di-tert-butyl para-cresol), tetrakis[methylene(3,5 di-tert-butyl-4-hydroxyhydrocinnamate)]methane, 4,4'-thiobis(6-tert-butyl-o-cresol); 6-(4-hydroxyphenoxy)-2,4-bis(n-octyl-thio)-1,3,5 triazine; 1,3,5-trimethyl-2,4,6-tri-(3,5-ditertbutyl-4-hydroxybenzyl) benzene; 2,6-ditertbutylphenol; zinc dibutyl dithiocarbamate; 4,4'-methylene-bis-(2,6-di-tert-butylphenol); tetrakis[methylene-3-(3',5'-di-t-butyl-4-hydroxyphenyl)-propionate]-methane; pentaerythritol tetrakis-3(3,5-di-tert-butyl-4-hydroxyphenyl)-propionate; lauryl stearyl thiodipropionate; sorbitol hexa[3-(3,5-di-tert-butyl-4-hydroxy-phenyl)-propionate]; dilauryl 3,3'-thiodipropionate; 2,6-di-tert-butyl-p-cresol; octadecyl-3-(3,5-di-tertbutyl-4-hydroxyphenol)-propionate and mixtures thereof.

Suitable materials used as stabilizers and thickeners would include alkaline polyacrylate solutions, alkali soluble acrylic copolymer emulsions, cellulose derivatives, polyvinyl methyl ether, polyurethane thickeners, polyethylene oxide, natural gums (including, Guar Gum, GumArabic, Gum Karaya, alginates, casein) and polyvinyl alcohol.

Biocides may be incorporated to prevent mold and bacteria growth in the resin dispersions and in the gypsum slurries. Generally, biocides may be added as the final component after the resin dispersion is synthesized. Uncontrolled bacteria growth in the resin dispersion may affect viscosity, pH, odor and other properties. Excessive bacteria growth may result in coagulation and out gassing of the resin dispersion. For example, BIT (1,2-benzisothiazolin-3-one) may suitably be used as a biocide.

Additionally, the present invention provides a method of improving the moisture resistance of a gypsum product through the use of a resin dispersion that may be added to the gypsum during the manufacturing process. For example, one embodiment of the present invention provides a method to render a gypsum product moisture resistant, the method comprising the steps of: forming a mixture comprising gypsum and water; adding a resin dispersion to the aqueous gypsum mixture, wherein the resin dispersion comprises at least one resin, at least one surfactant, and water. In another embodiment, the method further comprises depositing the resulting gypsum resin mixture between a pair of paper liners, forming sheets of a gypsum product; and allowing the deposited mixture to dry. In yet another embodiment, the method further comprises setting the formed the gypsum mixture into a moisture resistant gypsum product.

According to the methods of the present invention, the resin dispersions are added in proportions sufficient to provide about 0.5 weight percent to about 65 weight percent based on the total weight of the gypsum mixture. In one embodiment of the present invention aqueous slurries of gypsum are formed and the resin dispersion are added in proportions sufficient to provide about 0.5 weight percent to about 65 percent weight percent, or from about 1 weight percent to about 60 weight percent, or from about 5 weight percent to about 50 weight percent, or from about 10 weight percent to about 40 weight percent, based on the total weight of the gypsum mixture.

One embodiment of the present invention provides a method of producing a moisture resistant gypsum board (i.e. also known as drywall) formed of a gypsum core member covered with porous sheet members such as paper boards, which are bonded on both surfaces of the gypsum core member. The resin dispersions of the present invention also may act as an adhesive and improve the bonding strength of the gypsum core and the paper boards in gypsum products.

The moisture resistant gypsum board has utility in numerous industrial, commercial and residential applications where high moisture or humidity is present, such as in bathrooms, kitchens, laundry rooms, utility rooms or basement areas. Moisture resistant gypsum board is commonly used in those environments where ceramic tile is placed over the gypsum board. Having a moisture resistant gypsum board also may provide a means for reducing the growth of organisms on the surface of the gypsum board, because many of these organisms, such as mold or fungi require moisture in order to grow.

Panels of gypsum wallboard which comprise a core of gypsum sandwiched between two sheets of facing paper have long been used as structural members in the fabrication of buildings. The panels are attached to supports and used to form the partitions or walls of rooms, elevator shafts, stair wells, ceilings and the like. A specialty application for the use of gypsum wallboard panels, as well as other types of building panels, is their use in bathrooms, which are typically places of high humidity and having residual water, because of the flow of water from the use of showers, bathtubs, sinks and the like.

Gypsum wallboard panels are generally made by positioning a slurry of gypsum between fibrous liners, generally a paper, applying pressure to the gypsum/liner sandwich to produce a given thickness, allowing the product to set and harden before being cut into panels of specific lengths and widths, and then drying the product to remove excess moisture. Other additives, depending upon the properties desired in the final product, are generally added to the slurry before it is positioned between the fibrous liners.

Ordinary gypsum wallboard, gypsum tile, gypsum block, gypsum casts, and the like have relatively little resistance to water and moisture. When ordinary gypsum wallboard, for example, is immersed in water the board quickly absorbs a considerable amount of water, and loses a great deal of its strength.

One embodiment of the present invention provides a method of making moisture resistant gypsum panels having a core sandwiched between a pair of liners wherein the core comprises the set gypsum composition of the invention. Another embodiment of the present invention provides a method of making moisture resistant gypsum panels which involves forming a layer of the gypsum composition of the invention on a first liner, placing a second liner on the opposite surface of the layer from the first liner to from an assembly of the liners with the layer sandwiched there between, and drying the assembly while allowing hydration of the gypsum composition to form a panel.

One embodiment of the present invention provides a method of making moisture resistant gypsum panels having a core sandwiched between a pair of liners wherein the core has been coated with the resin dispersion compositions of the present invention. In these embodiments, the method comprises the steps of: forming a mixture comprising gypsum and water; adding a resin dispersion to the aqueous gypsum mixture, wherein the resin dispersion comprises at least one resin, at least one surfactant, and water; setting the gypsum mixture as the core of the gypsum product; coating the resulting core with additional resin dispersion; depositing the coated gypsum core between a pair of paper liners; forming sheets of a gypsum product; and allowing the deposited mixture to dry. Suitably, in these embodiments, only one side of the gypsum core may be coated or both sides of the gypsum core may be coated in some applications. The coatings may be of any desired thickness and may be applied by any conventional coating method such as spraying.

In another embodiment, the resulting gypsum mixture is applied to a first liner to form a layer of the mixture on the liner and then a second liner is applied to the top of the layer thus forming an assembly with two outer liners having a layer of the gypsum slurry containing the aqueous emulsion sandwiched there between. The assembly is then subjected to drying conditions which removes excess water and causes hydration of the gypsum and a moisture resistant gypsum wallboard product results. It is mentioned that the liners can be of most any sheet-like material such as paper or fiber mat. For example, in one embodiment the sheet-like material is a porous material.

Other conventional ingredients such as foaming agents, set accelerators and the like may be included in the gypsum slurries as is understood in the art. For example, agents such as accelerators may be added to control properties, within limits, such as the setting time of the composition. Such agents include potassium sulfate, ball mill accelerators, aluminum sulfate, calcium sulfate, ferric chloride and ferric sulfate, a tertiary amine such as dimethylethanolamine, an organometallic compound such as dibutyltindilaurate, and other compounds known to those skilled in the art. To further control the setting time of the compositions, retarding agents can be added; these agents, working in conjunction with the accelerators, affect the set time of the composition.

Starch, zeolites or other desiccating agents may be added, as well as aggregates or fillers such as sand, vermiculite, perlite, pumice, pozzolanic aggregates, or others known to those skilled in the art. Additional constituents may include dispersing agents, foaming agents, and reinforcing materials or fibers. Such fibers can include glass fibers, polyvinyl alcohol fibers, polyamide fibers, polyester fibers, polyolefin fibers, synthetic resin fibers, wood fibers, wood chips, or other cellulosic fibers. Antimicrobials and antifungal compounds, copper sulfate, and a variety of biocides, can also be added to prevent the growth of mold or other organisms or microorganisms.

This invention can be further illustrated by the following examples of potential embodiments thereof, although it will be understood that these examples are included merely for the purposes of illustration and are not intended to limit the scope of the invention unless otherwise specifically indicated. Parts and percentages mean parts by weight and percentages by weight, unless otherwise specified.

EXAMPLES

In the preparation of the following Examples, gypsum drywall panels were purchased from a home improvement store. The drywall panels consisted of a core of gypsum sandwiched between sheets of facing paper. The facing paper was removed and the gypsum was chipped from the facing paper. The gypsum was pulverized with a mallet between sheets of paper. The gypsum was then dried in an oven for 4-6 hours at 200° C. to remove moisture and form calcined gypsum (calcium sulfate hemihydrate).

Examples 1-2

A 500 gram sample of a wax emulsion was prepared as follows. 338 g Water was charged to a 1 liter flat bottomed glass vessel. The water was heated to approximately 95° C. 120 grams of Epolene E10, 21 grams of Pamolyn 100FGK and 21 grams of morpholine were charged to a separate vessel and heated to approximately 110° C. After the resins and surfactants were thoroughly mixed, the wax mixture was slowly decanted into the heated water under agitation. The wax mixture was added slowly so the temperature was maintained at 85-90° C. After the wax mixture was fully incorporated, the batch was slowly cooled to room temperature, filtered and dispensed into a one liter container. The finished wax emulsion had a total solids content of 30%.

Example 1

A wax emulstion slurry was prepared in a 1 liter container. A 1 liter container was charged with 123 g calcined gypsum. 150 grams of deionized water was slowly added under agitation. After the gypsum/water blend was thoroughly mixed, 17.2 grams of Epolene E10 wax emulsion was added and mixed thoroughly.

Example 2

Wax emulsion slurry was prepared in a 1 liter container. A 1 liter container was charged with 123 g calcined gypsum. 148.5 grams of deionized water was slowly added under agitation. After the gypsum/water blend was thoroughly mixed, 55.9 grams of Epolene E10 wax emulsion was added and mixed thoroughly.

Example 3

A silicon oil slurry was prepared in a 1 liter container. A 1 liter container was charged with 123 g calcined gypsum. 148.5 grams of deionized water was slowly added under agitation. After the gypsum/water blend was thoroughly mixed, 5.1 grams of Dow Corning 200R Fluid 50CST silicon oil was added and mixed thoroughly.

Examples 4-8

For the preparation of Examples 4-8, Tacolyn resin dispersions, commercially available hydrocarbon resin dispersions from Eastman Chemical Company, were used to prepare slurries in a 1 liter container. 1 liter container was charged with 123 g calcined gypsum. 148.5 grams of deionized water was slowly added under agitation. After the gypsum/water blend was thoroughly mixed, 12.5% (dry weight) of Tacolyn resin dispersions were added and thoroughly mixed again.

TABLE 1

| Example | Resin Dispersions | % Solids | Viscosity (cps) | pH | Particle size (nm) |
|---|---|---|---|---|---|
| 4 | Tacolyn 1070 | 55 | 1400 | 10 | 250 |
| 5 | Tacolyn 5070 | 50 | 100 | 4 | 250 |
| 6 | Tacolyn 5085 | 55 | 1300 | 10 | 250 |
| 7 | Tacolyn 5095 | 55 | 600 | 10 | 250 |
| 8 | Tacolyn 3400 | 55 | 1100 | 10 | 225 |

Table 1 provides a summary of the Tacolyn resin dispersions used in Examples 4-8.

Example 9

A 1 liter container was charged with 123 g calcined gypsum. 148.5 grams of deionized water was slowly added under agitation. After the gypsum/water blend was thoroughly mixed, 6.25% (dry weight) of Tacolyn 1070 and 6.25% (dry weight) of Tacolyn 5070 were added and thoroughly mixed again.

Sample Preparation

Sample pellets were prepared as follows. A 1½" diameter× 2" PVC fitting was sprayed with silicone mold release and placed on a glass plate. The Epolene E10 wax emulsion/gypsum slurry was decanted into the PVC fitting and filled to approximately ½" in depth. The samples were placed in a 55° C. oven for 30 minutes. The samples were removed from the oven and placed onto a mesh screen. It was necessary to place the samples on a mesh screen to facilitate water evaporation. The samples were then returned to the 55° C. oven, and a 500 gram weight was immediately placed on top of the Epolene E10/gypsum slurries to press the samples. The samples were dried overnight (approximately 18 hours) at 55° C. The samples were removed from the oven, allowed to cool and placed in a CTH room (23° C./50% relative humidity). The sample pellets for each of the resin dispersion/gypsum slurries were prepared in the same manner.

For the water immersion test, the sample pellets were removed from the PVC fitting using a knife. The sample pellets were weighed, placed on a mesh screen and then immersed in room temperature tap water for two minutes. Excess water was blotted off the surface of the pellet and the pellet was reweighed to obtain the percentage of water absorbed. As illustrated in Table 2, the gypsum sample pellets containing Tacolyn 1070 absorbed approximately 2 wt % less water than the comparative wax emulsion samples. Visual observation of the Tacolyn 1070 sample pellets indicated that water was absorbed at a slower rate. Gypsum samples prepared without applied pressure (500 gram weight) degraded immediately when placed in water.

TABLE 2

| Test | Gypsum | Tacolyn 1070 Resin Dispersion | Epolene E-10 Wax Emulsion |
|---|---|---|---|
| Water Immersion (% water absorbed) | Completely disintegrated | 35.4 ± 0.7 | 37.5 ± 0.7 |
| Water Absorption rate (seconds) | <1 | 6.7 ± 2.2 | 4.4 ± 0.8 |

For the water absorption rate testing, the sample pellets were left intact in the PVC fitting. The smooth side of the sample pellet was used for testing. A capillary tube (O.D 1.5-1.8 mm with a 0.2 mm wall thickness) was filled with 1 inch of water and placed on the surface of the sample pellets. The amount of time it took for the water to be absorbed into the pellet was recorded. Gypsum sample pellets containing Tacolyn 1070 performed comparably to samples containing the wax emulsion. The neat gypsum samples absorbed water instantly (rate <1 second).

TABLE 3

| Example | Example Details | Water Absorption Rate (Sec) | % Water Absorption |
|---|---|---|---|
| 1 | Epolene E-10 (4%) | 4.4 | 37.5 |
| 2 | Epolene E-10 (12%) | 6.2 | 35.3 |
| 3 | Dow Corning 200R Fluid 50CST | 11.2 | Disintegrated |
| 4 | Tacolyn 1070 | 6.7 | 35.4 |
| 5 | Tacolyn 5070 | 2 | 37.2 |
| 6 | Tacolyn 5085 | 11.1 | 26.9 |
| 7 | Tacolyn 5095 | 18.4 | 31.1 |
| 9 | Tacolyn 1070 + Tacolyn 5070 (50/50) | 14.6 | 32.6 |

As summarized in Table 3, the Examples containing the resin dispersions according to the present invention have improved moisture resistance as demonstrated by their slower water absorption rates.

The invention has been described in detail with particular reference to preferred embodiments thereof, but it will be understood that variations and modifications can be effected within the spirit and scope of the invention.

We claim:

1. A moisture resistant gypsum composition comprising a dried mixture of gypsum and a resin dispersion comprising at least one resin selected from the group consisting of polyterpene resins and hydrogenated polyterpene resins; aliphatic petroleum hydrocarbon resins and the hydrogenated derivatives thereof; aromatic hydrocarbon resins and the hydrogenated derivatives thereof; and alicyclic petroleum hydrocarbon resins and the hydrogenated derivatives thereof dispersed in water, wherein the moisture resistant gypsum composition excludes a wax.

2. The composition of claim 1, wherein the resin is selected from the group consisting of aliphatic petroleum hydrocarbon resins and the hydrogenated derivatives thereof; aromatic hydrocarbon resins and the hydrogenated derivatives thereof; and alicyclic petroleum hydrocarbon resins and the hydrogenated derivatives thereof.

3. The composition of claim 1, wherein the resin is selected from the group consisting of aliphatic resins, cycloaliphatic resins, aromatic hydrocarbon resins, mixed aliphatic-aromatic resins and the hydrogenated derivatives thereof, polyterpenes, synthetic polyterpenes, natural terpenes, and aromatically modified terpene resins.

4. A moisture resistant gypsum composition comprising gypsum and a resin selected from the group consisting of modified rosins and the hydrogenated derivatives thereof; esters of modified rosins and the hydrogenated derivatives thereof; polyterpene resins and hydrogenated polyterpene resins including natural terpenes, aromatically modified terpene resins, and synthetic polyterpenes; aliphatic petroleum hydrocarbon resins and the hydrogenated derivatives thereof; aromatic hydrocarbon resins and the hydrogenated derivatives thereof; alicyclic petroleum hydrocarbon resins and the hydrogenated derivatives thereof, cycloaliphatic resins, mixed aliphatic-aromatic resins, pentaerythritol, glycerols and triethylene glycol esters of rosin, wherein the resin is not a Diels-Alder adduct of maleic anhydride and wherein the moisture resistant gypsum composition excludes a wax.

5. The composition of claim 1 or 4, wherein the resin is present in the composition in an amount in the range of from about 0.5 weight percent to about 65 weight percent, based on the total weight of the composition.

6. The composition of claim 1 or 4, further comprising a surfactant.

7. The composition of claim 6, wherein the surfactant is selected from the group consisting of a rosin acid, a hydrogenated rosin acid, a disproportionated rosin acid, and a modified rosin acid.

8. An article comprising:
a core member comprising a moisture resistant gypsum composition, wherein the core member presents at least one surface; and
at least one lining member bonded to at least a portion of the at least one surface of the core member,
wherein the moisture resistant gypsum composition comprises gypsum and at least one resin, wherein the resin is not a modified or unmodified rosin, rosin derivative, rosin ester, or hydrogenated rosin ester and wherein the moisture resistant gypsum composition excludes a wax.

9. A gypsum-containing article comprising the moisture resistant gypsum composition of claim 1 or 4.

10. The article of claim 9, wherein the article is selected from the group consisting of a regular gypsum board, an impregnated board, a hard board, a high density board, a water repellent board, a wallboard, a cement board, a tile, a block, and a cast.

11. A gypsum-containing article selected from the group consisting of a regular gypsum board, an impregnated board, a hard board, a high density board, a water repellent board, a wallboard, a cement board, a tile, a block, and a cast, wherein the article comprises a moisture resistant gypsum composition formed by combining a mixture comprising gypsum and water with a resin dispersion to thereby form an aqueous gypsum mixture, wherein the resin dispersion comprises at least one resin selected from the group consisting of polyterpene resins and hydrogenated polyterpene resins; aliphatic petroleum hydrocarbon resins and the hydrogenated derivatives thereof; aromatic hydrocarbon resins and the hydrogenated derivatives thereof; and alicyclic petroleum hydrocarbon resins and the hydrogenated derivatives thereof, at least one surfactant, and water, wherein the moisture resistant gypsum composition excludes a wax.

12. The composition of claim 6, wherein the surfactant was present in the resin dispersion in an amount in the range of from about 5 to about 10 weight percent, based on the total weight of the dispersion.

13. The composition of claim 4, wherein the resin has a Ring and Ball softening point of at least 100° C.

14. The article of claim 8, wherein the core member presents a second surface; and further comprising a second lining member bonded to at least a portion of the second surface of the core member.

15. The article of claim 8, wherein the resin is selected from the group consisting of modified rosins and the hydrogenated derivatives thereof; esters of modified rosins and the hydrogenated derivatives thereof; polyterpene resins and hydrogenated polyterpene resins including aromatically modified terpene resins, and synthetic polyterpenes; aliphatic petroleum hydrocarbon resins and the hydrogenated derivatives thereof; aromatic hydrocarbon resins and the hydrogenated derivatives thereof; alicyclic petroleum hydrocarbon resins and the hydrogenated derivatives thereof, cycloaliphatic resins, and mixed aliphatic-aromatic resins.

16. The article of claim 8, wherein the resin is not a Diels-Alder adduct of maleic anhydride and wherein the resin has a Ring and Ball softening point of at least 100° C.

17. The article of claim 11, wherein the surfactant was present in the resin dispersion in an amount in the range of from about 5 to about 10 weight percent, based on the total weight of the dispersion.

\* \* \* \* \*